July 6, 1965  C. STREET  3,193,826
WIND DRIFT RECORDER
Filed Sept. 27, 1962  3 Sheets-Sheet 3
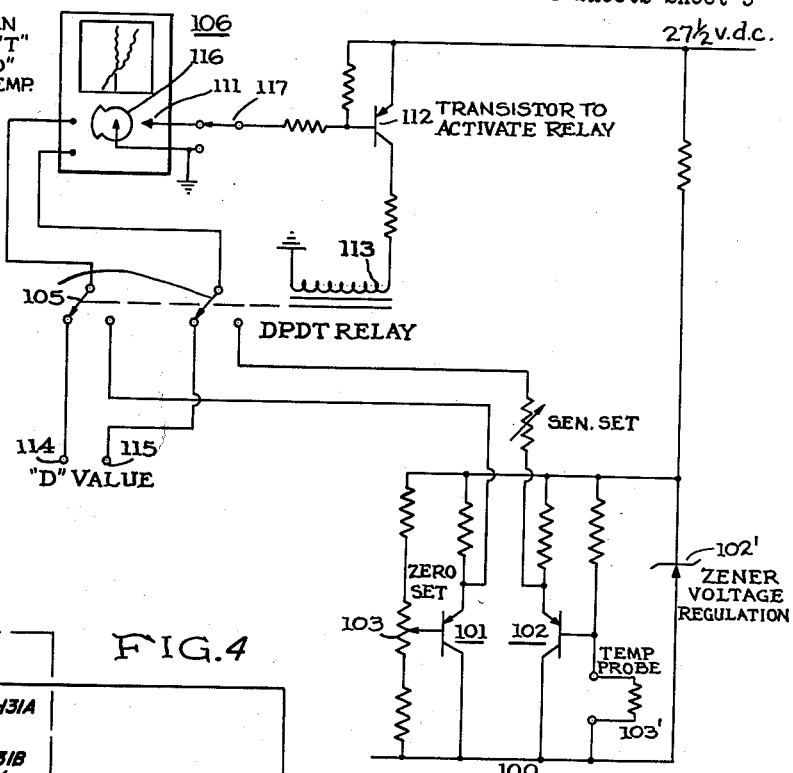
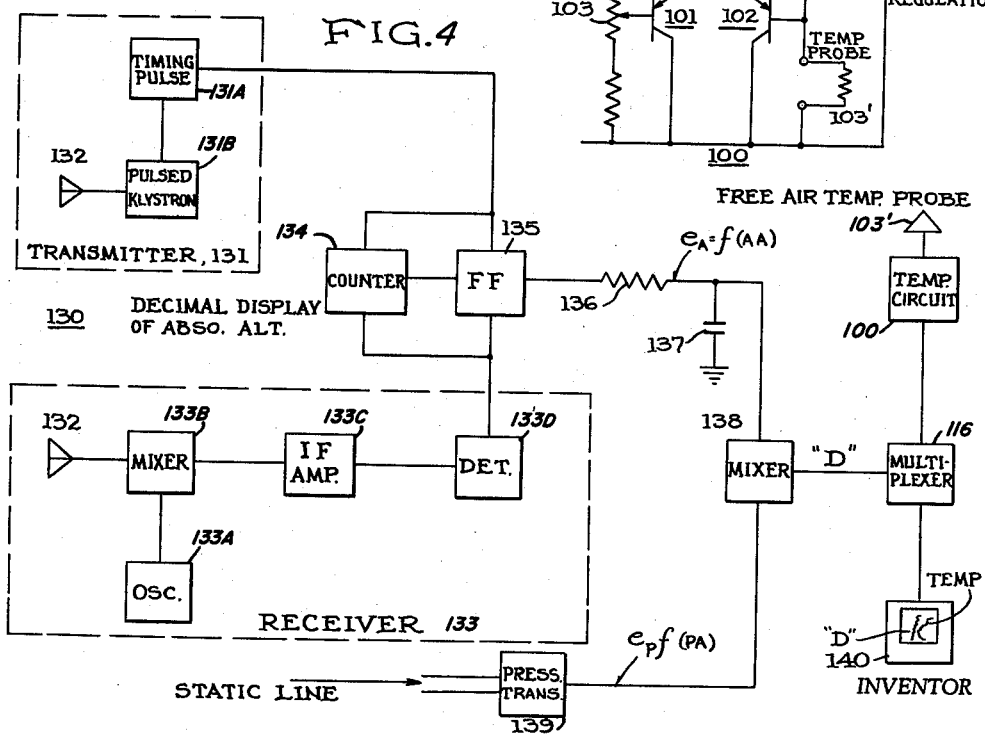
INVENTOR
CHAN STREET
BY Cameron, Kerkam + Sutton
ATTORNEYS United States Patent Office 3,193,826
Patented July 6, 1965

3,193,826
WIND DRIFT RECORDER
Chan Street, 805 El Segundo Blvd., El Segundo, Calif.
Filed Sept. 27, 1962, Ser. No. 226,502
6 Claims. (Cl. 343—17.1)

The present invention relates to a wind drift recorder and more particularly to a wind drift recorder for indicating lateral displacement of an aircraft in flight.

In an aircraft in flight, the determination of lateral displacement due to cross winds is an important aid in aircraft navigation, particularly at high altitudes where the jet streams are regions of sharp pressure changes and therefore, high wind velocity. By proper evaluation of the lateral displacement, a navigator can determine the necessary correction to take advantage of the most favorable winds to reach his destination.

Generally, known arrangements for determining the lateral displacement of aircraft in flight require periodic readings of a radio altimeter reading and a pressure altimeter reading along the flight path. By applying the algebraic difference of these readings, at different periods, to known equations, the lateral displacement of an aircraft in flight may be determined.

Known arrangements of prior art systems for determining lateral displacement of an aircraft in flight suffer distinct disadvantages which render them objectionable for present day navigational techniques, particularly at high altitudes. For example, a lag of pressure altimeters now in use is quite large for small variations in pressure making it difficult to read precise values of pressure changes. In addition, the "D" value, that is, the difference in reading of a radio altimeter and pressure altimeter may change radically in short intervals of time and go unnoticed by the navigator taking periodic readings. Another disadvantage of prior art systems, such as frequency modulated radio altimeters presently in use, is that they are generally unsuitable for high altitude measurements above twenty thousand feet, making it difficult for navigators to effectively utilize the forces of the jet streams which are present at higher altitudes.

Accordingly, it is an object of the present invention to provide an improved wind drift recorder which overcomes the disadvantages of prior art systems described hereinabove.

Another object of the present invention is to provide a wind drift recorder which gives a continuous flow of information and visually indicates lateral displacement of an aircraft in flight.

A further object of the present invention is to provide a wind drift recorder for operation at high altitudes to enable a navigator to derive optimum benefits from existing jet streams for an aircraft in flight.

With the above objects in mind, the present invention comprises an electronic unit that receives, from a radar altimeter, pulses whose time separation is proportional to the height of the aircraft above the surface of the earth, and converts these pulses into a D.C. voltage whose magnitude is a measure of any deviation from the reference altitude at which the plane is flying. A pressure transducer, using a vacuum as a reference, measures the pressure altitude and develops a signal that is compared with that of the radar altimeter. The difference between the two measurements drives a strip chart recorder which provides a continuous indication of lateral displacement of the aircraft in flight.

In another embodiment of the present invention, a temperature-measuring system is multiplexed with the wind drift recorder to provide a simultaneous indication of external temperature along with the indication of lateral displacement of the aircraft. The simultaneous indication of temperature external to the aircraft and lateral displacement of the aircraft in flight can then be used to maintain weather maps accurately up to date at all times, thus making it possible for flight crews to navigate with assurance as to weather to be encountered and the course to follow to take advantage of the jet streams.

While the specification concludes with claims particularly pointing out and distinctly claiming the subject matter regarding the invention, it is believed that the invention will be better comprehended from the following description taken in connection with the accompanying drawings in which:

FIGURE 3 is a schematic diagram of a transistorized temperature-measuring system; and FIGURE 4 is another embodiment of the drift recorder of the present invention.

Figure 1:
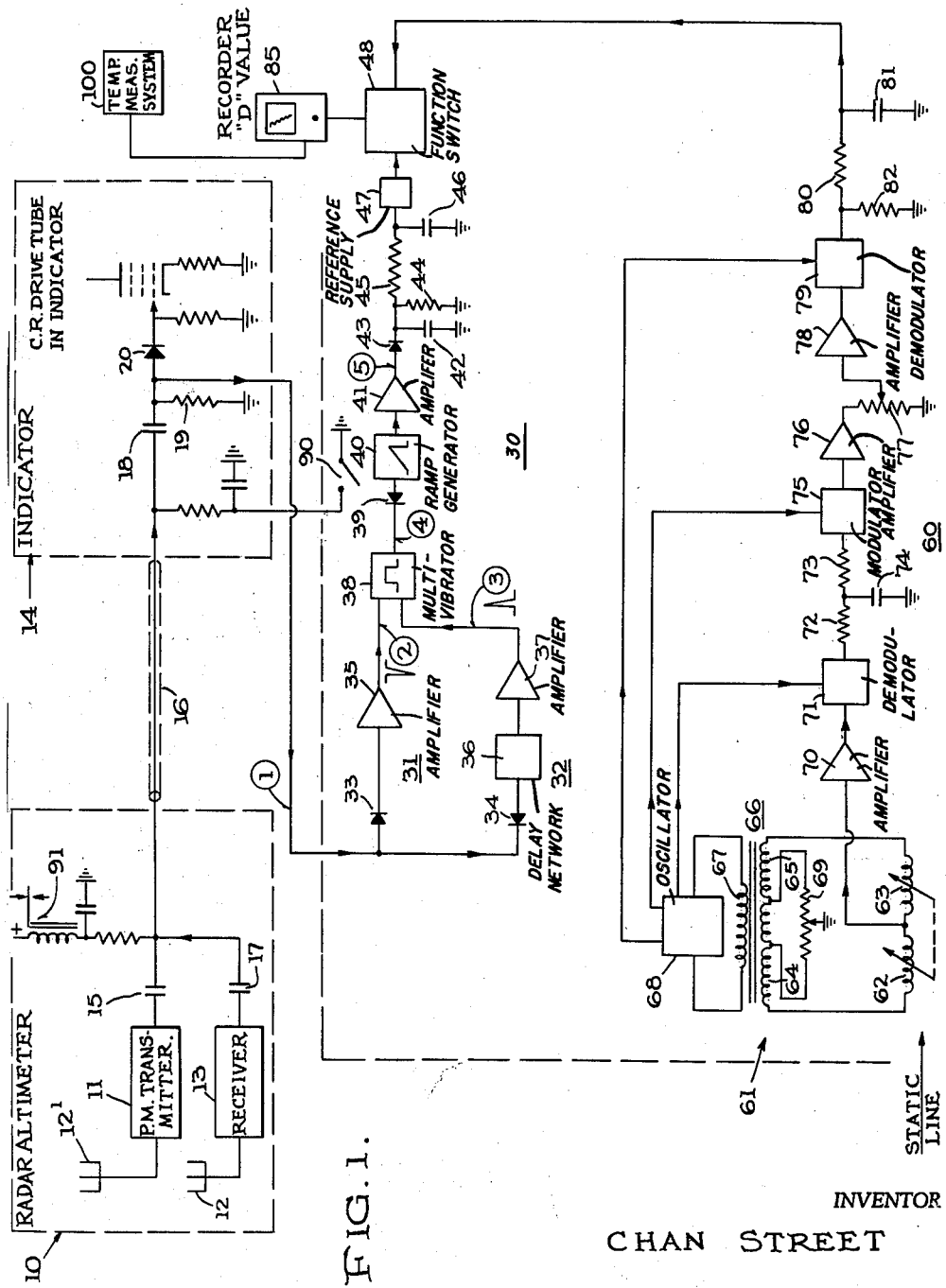
FIGURE 1 is a block diagram of the wind drift recorder of the present invention.

In an aircraft in flight, any reading of atmospheric pressure is a function of two variables. The first is the height of the aircraft above mean sea level, and the second is the absolute pressure of the atmosphere in that region of space. For the former, there has been specified what is known as a "standard atmosphere," i.e., a specific relationship between the height above mean sea level and the pressure that will exist. Conventional pressure altimeters are calibrated to this standard. A second factor is an unspecified variable that changes from many causes. These two pressure functions cannot be separated by any simple pressure-measuring means.

As the differences of pressure over the surface of the earth tend to equalize by a flow of air from high into low pressure regions, a vortex is formed, i.e., the air circulates in large, rotating masses. This rotation is produced by the gyroscopic effect of the earth's rotation and is referred to as the Coriolis force. This Coriolis force is well-known in meteorology and varies with the distance from the equator. At the equator, Coriolis force is 0 and gets progressively stronger toward the poles. From about 20° latitude and higher, the Coriolis force is sufficient to produce moving air masses that will rotate counterclockwise in the Northern Hemisphere about a low pressure region and clockwise in the Southern Hemisphere.

The velocity of the air's motion due to this rotation is a function of the difference of pressure as measured at right angles to the direction of the air's motion in a horizontal plane. The more rapidly the pressure changes with distance, the higher the air's velocity. If a map is made by drawing a line through points of the same pressure (this may be done for a plane surface at any height above the earth), a line of constant pressure is produced called an isobar. The winds blow approximately parallel to the isobar, since along these lines there is no change of pressure. In areas of high and low pressure, the isobars are curved. The circulation of air around these high and low pressure areas is therefore a long-curved path. In a low pressure area, the winds travel in counterclockwise direction in the Northern Hemisphere and clockwise in the Southern Hemisphere, as viewed from above the surface of the earth. Similarly, in a high pressure area, the winds travel in a clockwise direction in the Northern Hemisphere and in a counterclockwise direction in the Southern Hemisphere.

If a plane moving through the atmosphere could be kept at an exactly constant height above the surface of the earth (mean sea level), then by measuring the pressure surrounding the craft there would be knowledge of the rate at which the pressure is changing, and therefore the relative velocity of the wind at right angles to the line of flight. Aircraft, however, are flown at a constant pressure altitude, that is, they maintain a constant altitude as shown on pressure-measuring instrument calibrated to "standard atmosphere." Thus they rise or descend with the atmosphere's pressure changes as they fly their course. This change in absolute altitude is thus an indication of the changes of atmospheric pressure along the flight path, and if these changes are known they can be interpreted into the relative changes in pressure.

In normal practice, a measure of this change is obtained by reading the difference in indicated altitude as read on a pressure altimeter and radio altimeter which shows the actual altitude in feet above the surface below. This difference is called the "D" value. If readings are taken at specific points along the flight path, then knowledge is obtained of the relative pressure changes, and thus an indication of the changes in atmosphereic pressure. A relationship between these values and the velocity of wind at right angles to the flight path has been developed and can be expressed by the equation:

Equation 1 $$LD = \frac{K(D_2 - D_1)}{TAS}$$

where, LD equals the lateral displacement of the aircraft between points where $D_1$ and $D_2$ were determined, TAS equals the true air speed of the aircraft and K is a constant involving the gyroscopic moment of the earth and the sine of the mean latitude between the points $D_1$ and $D_2$. The difference between the readings of $D_2$ and $D_1$ is equal to the "D" reading. If instead of true speed, the air distance AD is used in the above relationship, then the velocity ($V_d$) of the aircraft's displacement at right angles to its heading is given as:

Equation 2 $$Vd = \frac{K(D_2 - D_1)}{AD}$$

Of the two equations, the former relationship is the most valuable, since it accumulates the integrated effect of time and velocity. The aircraft's true air speed is relatively constant, but the lateral velocity may fluctuate through wide limits during a flight.

In flying into a low pressure area in the Northern Hemisphere, the barometric pressure gradually decreases and a counterclockwise motion of the wind will cause the aircraft to drift toward the right. In leaving the low pressure area, the barometric pressure will increase and the wind will blow from right to left, causing a left drift. If the plane next flies into a high pressure area, the barometric pressure increases again, but the winds are blowing clockwise so that the aircraft will still be blown toward the left.

One possible method for computing wind drift is to compare the readings of a barometric or pressure altimeter and a radio or FM altimeter at some starting point in the flight path, and then to fly for some interval of time at either a constant radio altitude or a constant pressure altitude. At the end of this interval, the change in the pressure altimeter reading or radio altimeter reading as the case may be, is noted and the wind drift may be computed in accordance with the above equation, Equation 1.

The aforesaid method is disadvantageous in that the change in reading obtained is normally so small that comparatively long distances must be travelled before significant readings may be obtained and the aircraft heading corrected.

Moreover, this method entails working with several figures which may be rather large and an algebraic subtraction must be made at each point of the flight path at which readings are obtained, since the sign of the difference in readings is important in determing their direction of drift.

In accordance with one form of the present invention, a "D" value recorder continuously records information on the rate of drift of an aircraft in flight on a strip chart. When the recording on the chart appears as a straight line, there is no drift, while any deviation of the line to left or right is direct measure of the aircraft's displacement to the left or right of its course.

Referring to FIGURE 1, the absolute altitude is measured in conjunction with a conventional radar altimeter 10. The radar altimeter 10 comprises a pulse modulated transmitter 11 having antenna 12' operating at a frequency of 440 mc. with a pulse width of 0.5 microsecond and a pulse repetition rate of approximately 98 kc. The transmitted energy or pulse is reflected from the terrain or surface of the earth over which the aircraft is flying and received at the radar altimeter antenna 12, detected in the receiver 13 and translated to a CRT indicator 14 which may be located at the navigator's station. The time separation or transit time of the transmitted and received energy is measured on a circular trace of the indicator 14 which is calibrated in feet. One complete circular trace on the CRT is equal to five thousand feet. The absolute altitude thus appears as the measured value plus some multiple of five thousand feet.

Synchronization of the recorder, i.e., the time to start and stop measurement, is achieved by virtue of a negative reference pulse taken from the circuit that triggers the transmitter 11. This negative reference pulse is applied to indicator 14 through D.C. blocking capacitor 15 in series with line 16. Since the transmitter and receiver are normally located in the tail section of the aircraft and the indicator is located at the navigator's station, line 16 is preferably a fifty ohm impedance matched coaxial line which serves to minimize losses in the translated pulses. The received pulse is detected at the radar receiver 13 and applied to indicator 14 through D.C. blocking capacitor 17.

The reference pulse and received pulse, which are of opposite polarity, negative and positive respectively, are translated to capacitor 18 which blocks any D.C. component which may be present in the pulses, while resistor 19 serves to terminates the coaxial line with the correct impedance. Diode 20 is biased such that negative reference pulses are blocked, while the positive received pulses are translated or passed to the CRT indicator 14 to provide an altitude indication on the face of the tube.

The junction of capacitor 18 and diode 20 is connected to the "D" value computer 30 which comprises two channels 31, 32 for the received pulse and reference pulse respectively. Diodes 33 and 34 connected in channels 31 and 32 respectively are oppositely biased whereby the positive echo pulse is translated to amplifier 35, while the negative reference pulse is translated to delay network 36. Amplifier 35 comprises an inductive ringing circuit which is damped by a diode so that only a single pulse is developed of negative polarity. This circuit cannot again be triggered until the magnetic field is dissipated and rebuilt, thus providing a blocking action for approximately 1 to 1.5 miscroseconds, and thereby preventing the circuit from responding to multiple pulses arriving in the receiver immediately following the transmitted pulse.

Delay network 36 may comprise any conventional delay circuitry which furnishes a delay of approximately 0.8 microsecond from the reference pulse. The delay is required so that the reference pulse will always arrive at a time after the heavy ringing of the receiver due to the transmitted pulse has ceased. The delay signal is then shaped in pulse-shaping network 37 into a sharp positive pulse.

To eliminate any undesirable modulation effects which might occur when received signals are directly reflected from the aircraft propeller resulting in only a small percentage of the echo pulses being received at the receiver with sufficient strength to register an output, the echo signal is utilized to initiate measurement in the system and the reference signal is used to stop measurement. To this end, gating circuit 38 is used. Circuit 38 may be a conventional flip flop multivibrator which is triggered "on" by the echo pulse and triggered "off" by the reference pulse, thus generating a rectangular pulse whose pulse width is a function of the distance the aircraft is below some five thousand foot multiple.

Figure 2:
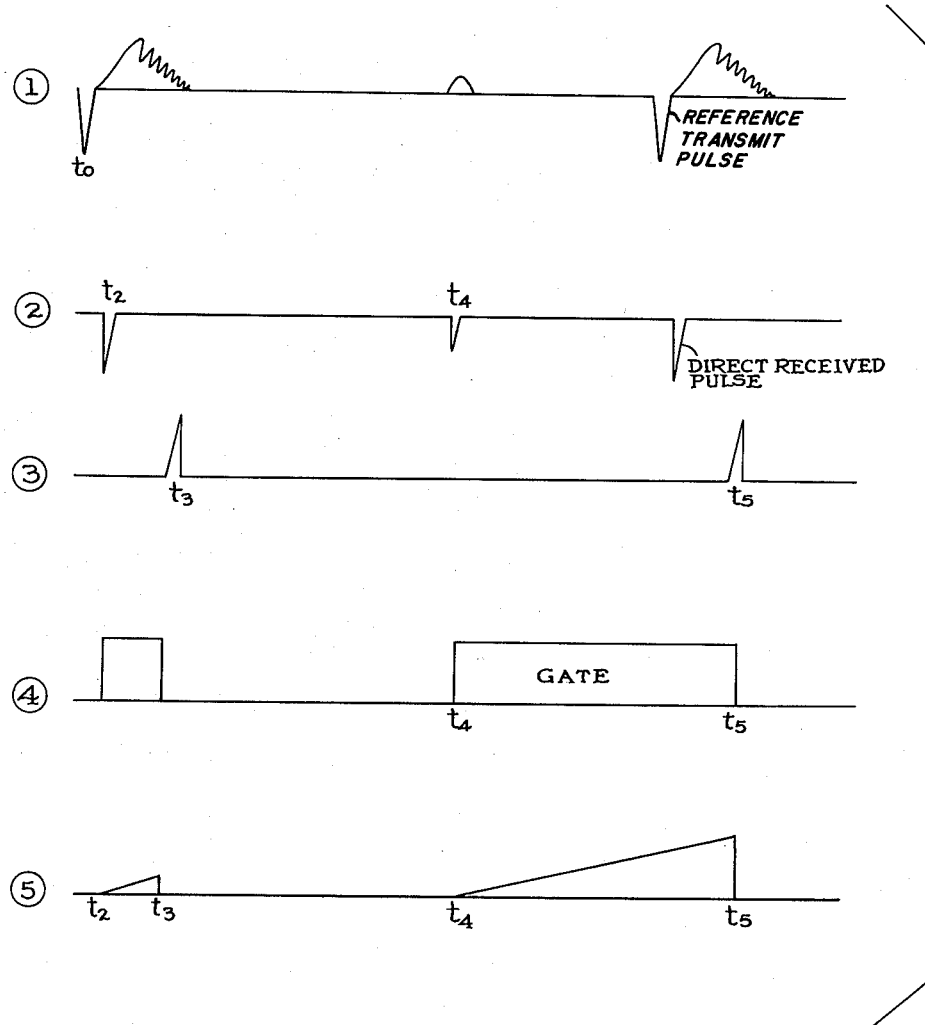
FIGURE 2 is a timing diagram illustrating the time relationship of the control pulses of the present invention.

Referring to FIGURE 2, the time relationship of pulses is shown. At $t4$, the echo pulse triggers the gating circuit 38 which will stay on until the next reference pulse is received at $t5$, turning the gate off. If a propeller blade is in such a position at the instant an echo pulse is returned that it can reflect energy to the receiving antenna, this energy mixes with the direct echo. The delay of this reflected energy is very small being only 0.04 $\mu s$. for 40′. Both of these signals are RF energy at 440 mc. The probability is 2:1 that they may be out of phase with each other and thus produce cancellation. In this case the receiver will receive no signal and a pulse will be missed. This is a completely random effect and is the reason the echo pulse is used to initiate a measurement. Referring to FIG. 2, if in one of the cycles an echo pulse is missed, the gate will not turn on, but when the receiver picks up the next transmitted pulse, not from the propeller but from antenna to antenna, this acts as an echo and turns on the gate at $t_2$. This is immediately followed by the delayed reference pulse at $t_3$ and shuts it off. The ramp from $t_2$ to $t_3$ is always smaller than a truly measured echo and therefore does not effect the reading.

The square wave pulse output of gate 38 is applied through diode 39 to a linear ramp function circuit 40 which develops a sawtooth pulse or ramp function in response to the output of gate 38. The sawtooth pulse increases linearly with time, and thus the height of the pulse is proportional to the time the gate is open, thereby providing an indication of altitude. Any conventional circuitry may be utilized at 40 to develop the ramp function with a linear increase with respect to time, and the rate of increase of the ramp pulse may conveniently be selected as one volt per one thousand feet. The output of 40 is translated through emitter follower 41 which provides isolation and further translates the pulse to capacitor 42 through diode 43. Diode 43 prevents capacitor 42 from discharging back into the emitter follower stage 41. Resistor 44 and capacitor 42 form an RC circuit having a long time constant of approximately ten seconds thus maintaining capacitor 42 charged to the peak value of the ramp function signal. When a change in altitude occurs such as to cause the average value of the ramp function to change, for example, decrease, the discharge of capacitor 42 through resistor 44 results in a change in voltage across the capacitor corresponding to the change in altitude. Resistor 45 and capacitor 46 form an additional RC circuit having a time constant of approximately ten seconds and extends the total time constant of both RC circuits to approximately fourteen seconds.

The voltage developed across the timing circuit is fed to power source 47 which comprises a mercury battery and rheostat. The rheostat serves to provide an adjustable voltage which can be inserted in the line so as to buck the voltage developed in the timing circuit and permit the output of power source 47 to be set to zero for any altitude that is determined to be the reference. Once having determined the reference altitude, only a voltage representing the change from this reference will be translated to function switch 48.

The pressure measuring system 60 uses a vacuum as a reference and measures the pressure altitude and develops a D.C. signal which is compared with the output of the radar altimeter in the "D" value recorder. Referring to FIG. 1, the pressure transducer comprises a bridge 61, two arms of which are formed from a variable reluctance 62, 63. The opposite arms of the bridge 61 comprise the secondary windings 64, 65 of transformer 66. The primary winding 67 is adapted to receive the output of a one kilocycle oscillator 68 whose output is of constant frequency and constant amplitude. Transformer 66 is a step-up transformer which steps up the output amplitude of the oscillator 68 to approximately 50 volts and applies it across arms 64, 65 of the pressure transducer bridge 61. Connected to the junction of secondary winding 64, 65 is a resistance complex 69 comprising 11 steps of fixed resistances and a ten-turn potentiometer. The resistance complex 69 serves to pick out a five-foot reference point for any pressure altitude from sea level to 45,000 feet, i.e., one part in 9,000. By adjusting the value of resistance complex 69 when the aircraft has reached a cruising altitude, the signal at the junction of arms 62 and 63 may be balanced to zero. Any change in pressure resulting from a change in reference altitude after the bridge has been initially balanced results in an unbalance of the bridge circuit, and an output proportional to the unbalance is translated to amplifier 70 which further translates the signal to a ring demodulator 71. A second input to ring demodulator 71 comprises the one kilocycle signal from oscillator 68. Ring demodulator 71 utilizes matched silicon diodes and its output is a phase sensitive D.C. voltage proportional to the phase and amplitude of the A.C. signal input. The output of demodulator 71 is translated to an RC network comprising resistor 72, resistor 73 and capacitor 74 which serves as a filter to remove any hash or undesirable noise appearing on the signal and feeds the D.C. signal to the modulator 75 having a second input comprising the one kc. output of oscillator 68. Modulator 75 remodulates the D.C. signal and produces an A.C. signal which is translated to amplifier 76. Amplifier 76 comprises a conventional emitter follower having gain control 77.

Since pressure is not a linear function of altitude, and the system requires a standardized output as a function of change of altitude balance control 77 is provided to balance the ratio between pressure and absolute altitude. The absolute altitude has been set to give a one volt change per 1,000 feet as hereinbefore described. This means that whenever the aircraft changes altitude, the signal change from the pressure measuring system must match that of the absolute altitude side. For any altitude this will be a fixed point on the adjustment of the balance control 77. Thus, once determined, it can always be reset using the counter dial of the ten-turn potentiometer 77.

The portion of the A.C. signal passed by the balance control 77 is amplified in a conventional feed-back amplifier 78 and then demodulated in a ring demodulator 79 similar in operation to that of ring demodulator 71. The resulting D.C. output of demodulator 79 is filtered in an RC network comprising resistor 80 and capacitor 81, while resistor 82 establishes a ground reference for the output. The time constant of RC network 80, 81 is the same as that utilized in the absolute altitude system hereinbefore described so that one signal will not be changing rapidly while the other is shifting slowly.

The output from RC network 80, 81, is applied through functions switch 48 to the recorder 85. The recorder 85 comprises a vacuum tube voltmeter which receives signals from both altitude systems. As long as both signals change by the same amount and in the same direction the net output of the recorder is zero. This would be the case when the aircraft is flying in a region of space where there is no change in the "D" value. With a change in barometric pressure, a difference in pressure value exists and the change is recorded in recorder 85. Such a change constitutes a change of "D" value and may be recorded on a strip chart mechanism which would indicate a straight vertical line for periods of constant "D" value and a variation to the left or right for varying "D" values.

Function switch 48 enables the navigator to select either or both input signals, and thus, the recorder 85 may be selectively set to record only absolute or pressure altitude or the effect of both which will be a change of "D" value.

Whenever the aircraft is flying in the immediate region of any multiple of 5,000 feet, it should be readily apparent that an echo pulse may arrive at the same time that the transmitter is transmitting. The transmit pulse, by virtue of its high power, blocks the receiver for a short period immediately following the transmit pulse and the echo pulse is not received during the ringing time of the receiver. This means that in a region of 5,000 feet multiples from the earth the system is inoperative. To overcome this defect, a mechanism is provided for changing the frequency of the pulse modulated oscillator. Referring to FIG. 1, switch 90 is connected to a suitable power source in series with relay 91 which controls the selection of crystals thereby tuning the oscillator of the transmitter 11. When switch 90 is closed, relay 91 is energized switching its contacts thereby selecting an alternate crystal. The second frequency of the oscillator is such that the altitude interval is 4,000 feet and the transmitted pulse will not interfere with the reception of reflected energy or received echo signals when the aircraft is operating at altitudes of multiples of 5,000 feet.

Meterologists often require accurate temperature data associated with "D" values to maintain weather maps accurately up-to-date at all times. If a sufficient number of aircraft in flight were to make continual reports of the "D" values encountered as well as accurate air temperature readings, and their information assembled at some central point, such as a weather bureau, charts could be maintained which would make possible for the flight crews to plan their trips with assurance as to the weather to be encountered and the flight course to follow that would take advantage of jet streams where wind velocities reached values of 2000 m.p.h. This would result in considerable savings in operating costs and reduction of flight time. Accordingly, provision is made for taking temperature data of the region in space and multiplexing the recorder so that a time sharing recording can be made showing the temperature traces and "D" value traces on the strip chart.

Referring to FIG. 3, a schematic diagram of a transistorized temperature measuring system 100 is illustrated. The temperature measuring system comprises two transistors 101, 102 connected to a suitable power source. Transistor 101 establishes a voltage reference for the temperature measuring system and permits the recorder to be set to zero for any particular temperature which may be desired to be used as a reference. A constant bias supply is established by zener diode 102' across the emitter-collector terminals of the transistors. The zero set resistor 103 controls the base voltage of transistor 101 and consequently the conduction, thereby establishing the reference signal at the collector terminal for the desired temperature recorder. A temperature probe 103' which, may be a conventional nickel resistance thermometer whose electrical resistance varies with temperature, is electrically connected between the base-collector terminal of transistor 102 and monitors the air temperature external to the aircraft. Any variation in temperature results in a change in resitsance of temperature probe 103 thereby varying the voltage appearing at the base of transistor 102 thus controlling the conduction thereof. The output of transistor 102 is taken from the emitter terminal and applied through switch 105 to the recorder 106. Any difference between the reference voltage and the output voltage 102, which is proportional to the temperature, results in an indication recorded on the strip chart of recorder 106.

A multiplexing control arrangement is provided for the recorder which switches the recorder first to the "D" value and then to the temperature value. To this end, a cam 116 alternately opens and closes contact 111 connected in the base circuit of transistor 112. Relay 113, connected in the collector circuit of transistor 112, is alternately energized and de-energized in accordance with the closing and opening of contacts 111 by cam 116. Energization of relay 113 closes the contacts of switch 105, thus switching the temperature reading to the input terminals of the recorder 106. In the de-energized condition, the "D" value input is received at the recorder 106 input terminals from line terminals 114, 115. The timing cam 116, operated from any conventional driving source, regulates the opening and closing of the recorder contacts such that the "D" value on the recording sheet is a series of dashes and the trace of the temperature a series of dots. Switches 117 is provided at the recorder to permit the operator to manually connect the recorder to whichever circuit is desired, i.e., the temperature, "D" value or "D" value and temperature can be read individually as desired.

Referring to FIG. 4, an alternate embodiment of the drift recorder of the present invention is illustrated. The radar altimeter 130 comprises a high pulse transmitter 131 and receiver 133 operating in the range of two kilomegacycles. The high frequency transmitter and receiver utilize directional antennas 132 providing a sharply defined beamed energy pattern. The directional antenna 132 serves to provide a system of high sensitivity enabling reception of echo signals or reflected energy on every pulse of energy transmitted, thereby avoiding the problems hereinbefore mentioned when using low power radar altimeters with piston-type or turbo-jet aircraft. The high pulse transmitter 131 includes a conventional timing pulse generator 131A and a klystron 131B for establishing the transmitted energy pulse. The receiver 133 is likewise conventional and includes an oscillator 133A, a mixer 133B, an IF amplifier 133C and a detector 133D.

With the reception of reflected energy, or echoes for every transmitted energy pulse, the time interval of the transit time of the transmitted energy and the reflected energy may be utilized to generate a square wave pulse whose pulse width is a function of the transit time. The square wave pulse may then be integrated or converted into a D.C. analogue signal directly proportional to the pulse width.

Referring to FIG. 4, a flip-flop multivibrator 135 is triggered "on" with the transmit energy pulse and triggered "off" by the reflected energy or echo pulse, thus generating a square wave output pulse whose width is equal to the transit time. A counter 134 may be connected across the multi-vibrator 135 to provide a decimal display of absolute altitude. The output pulse is integrated across an RC circuiti comprising resistance 136 and capacitance 137 thereby developing across the capacitor 137 the average value of the square wave pulse. The D.C. voltage across capacitor 137 is applied to mixer 138 together with the D.C. signal output of the pressure transducer 139 and then translated to recorder 140 in a manner hereinbefore described.

Although the invention in its operation has been described with reference to specific embodiments, the invention is not limited to the particular embodiments shown or described. The present inventive concept may be varied without departing from the spirit and scope of the invention as defined in the following claims.

What is claimed is:

1. A wind drift recorder for indicating the lateral displacement of an aircraft in flight comprising: a pulse modulated radar altimeter including means for transmitting energy toward the terrain over which the aircraft is flying, means for receiving energy reflected from the terrain, first means connected to said transmitting and receiving means responsive to said transmitted and reflected energy for generating pulses whose time separation is proportional to the altitude of said aircraft and including means for converting said pulses to a voltage, a pressure transducer for developing a voltage in respones to the pressure altitude of said aircraft, and a recorder connected to said pressure transducer and said first means for indicating the magnitude and direction of the relative change in voltage of said first means and said pressure transducer.

2. A wind drift recorder for indicating the lateral displacement of an aircraft in flight comprising: a pulse modulated radar altimeter including means for transmitting energy toward the terrain over which the aircraft is flying, means for receiving energy reflected from the terrain, first means connected to said transmitting and receiving means responsive to said transmitted and reflected energy for generating a voltage proportional to the altitude of said aircraft, a pressure transducer for developing a voltage in response to the pressure altitude of said aircraft, temperature sensing means, a recorder, switching means connecting said pressure transducer, said first means and said temperature sensing means to said recorder for selectively indicating the magnitude and direction of the relaive change in voltage of said first means and said pressure means and the temperature in the region of space of said aircraft sensed by said temperature sensing means.

3. A wind drift recorder for indicating the lateral displacement of an aircraft in flight comprising: a pulse modulated radar altimeter including means for transmitting energy toward the terrain over which the aircraft is flying, means for receiving energy reflected from the terrain, means connected to said transmitting means and receiving means including gating means responsive to said transmitted and reflected energy for generating a voltage whose width is a function of the altitude of said aircraft, circuit means connected to said gating means for developing a ramp voltage whose amplitude is proportional to the width of said generated voltage, a power source connected to said circuit means for generating a reference voltage proportional to a predetermined reference altitude, said reference voltage being of such polarity as to buck said ramp voltage thereby establishing a reference voltage level at the output of said power source at the predetermined reference altitude, a pressure transducer for developing a voltage in response to the pressure altitude of the aircraft, switching means, a recorder, said switching means connecting said pressure transducer and the output of said power source to said recorder for selectively indicating the magnitude and direction of the relative change in voltage of the output of said power source and said pressure transducer.

4. The wind drift recorder as set forth in claim 3 further including: temperature sensing means connected to said recorder through said switching means for indicating the temperature in the region of space of said aircraft.

5. A wind drift recorder for indicating the lateral displacement of an aircraft in flight comprising: a pulse modulated radar altimeter including means for transmitting energy toward the terrain over which the aircraft is flying, means for receiving energy reflected from the terrain, first means connected to said transmitting means and receiving means responsive to said transmitted energy and said reflected energy for genearting a pulse whose width is a function of the transmit time of said transmitted energy and reflected energy, integrating means connected to the first means for integrating said pulse, a pressure transducer for generating a voltage in response to the pressure altitude of said aircraft, and a recorder connected to said pressure transducer and said integrating means for indicating the magnitude and direction of the relative change in voltage of said pressure transducer and integrating means.

6. A wind drift recorder for indicating the lateral displacement of an aircraft in flight comprising: a pulse modulated radar altimeter including means for transmitting energy toward the terrain over which the aircraft is flying, means for receiving energy reflected from the terrain, means connected to said transmitting means and receiving means, said means including a flip flop multivibrator triggered on by said transmitted energy and triggered off by said received energy thereby generating an output pulse whose width is a function of the transit time of said transmitted energy and said received energy, integrating means connected to said multivibrator for integrating the output pulse, a pressure transducer for generating a voltage in response to the pressure altitude of said aircraft, temperature sensing means for sensing the temperature in the region of space of said aircraft, a recorder, switching means connecting said pressure transducer, said integrating means and said temperature sensing means to said recorder for selectively indicating temperature and the magnitude and direction of the relative change in voltage of said pressure transducer and integrating means.

References Cited by the Examiner

UNITED STATES PATENTS 2,740,294 4/56 Sanders et al. _____ 343—14
2,847,855 8/58 Berger _____ 343—7 X CHESTER L. JUSTUS, *Primary Examiner.*